No. 780,043. PATENTED JAN. 17, 1905.
M. KORFF.
ILLUMINATING BODY.
APPLICATION FILED DEC. 18, 1903.

2 SHEETS—SHEET 1.

No. 780,043. PATENTED JAN. 17, 1905.
M. KORFF.
ILLUMINATING BODY.
APPLICATION FILED DEC. 18, 1903.

2 SHEETS—SHEET 2.

Witnesses
J. C. Hinkel
Thos. Howe

Inventor
Max Korff
by Forter Freeman & Watson
Attorneys

No. 780,043. Patented January 17, 1905.

UNITED STATES PATENT OFFICE.

MAX KORFF, OF HANAU-ON-THE-MAIN, GERMANY.

ILLUMINATING-BODY.

SPECIFICATION forming part of Letters Patent No. 780,043, dated January 17, 1905.

Application filed December 18, 1903. Serial No. 185,734.

*To all whom it may concern:*

Be it known that I, MAX KORFF, a subject of the German Emperor, residing and having my post-office address at Hanau-on-the-Main, Germany, have invented certain new and useful Improvements in Illuminating-Bodies, of which the following is a specification.

This invention relates to an improved globe for lamps, lanterns, and the like; and it substantially consists of a faceted metal frame into which are inserted glass prisms, pyramids, cones, or the like, each of said prisms or pyramids having three or more surfaces and each cone having a base with three or more sides. Devices of this kind are substantially known, but have hitherto had the disadvantage that they were formed by solid prisms or pyramids, by which a considerable part of the light generated within the illuminating-body was absorbed. The said solid bodies also had the disadvantage of adding to the weight and cost of manufacture of the article. To remove these disadvantages, I replace the solid prisms, pyramids, or cones by hollow bodies adapted to be separately inserted into the metal frame. By this means the light generated is allowed to pass freely through the illuminating-body, and the weight and cost of the latter are considerably reduced.

To obtain by means of the globes equally-efficient distribution of light and agreeable illuminating effects as with the known illuminating-bodies of the kind, the hollow prisms, pyramids, or cones are provided with faceted, step-shaped, fluted, or similar grooves; but if the object desired is not so much the distribution of light and an agreeable effect as an efficient utilization of the light generated the prisms, pyramids, or cones are made wholly or in part smooth.

Figure 1:
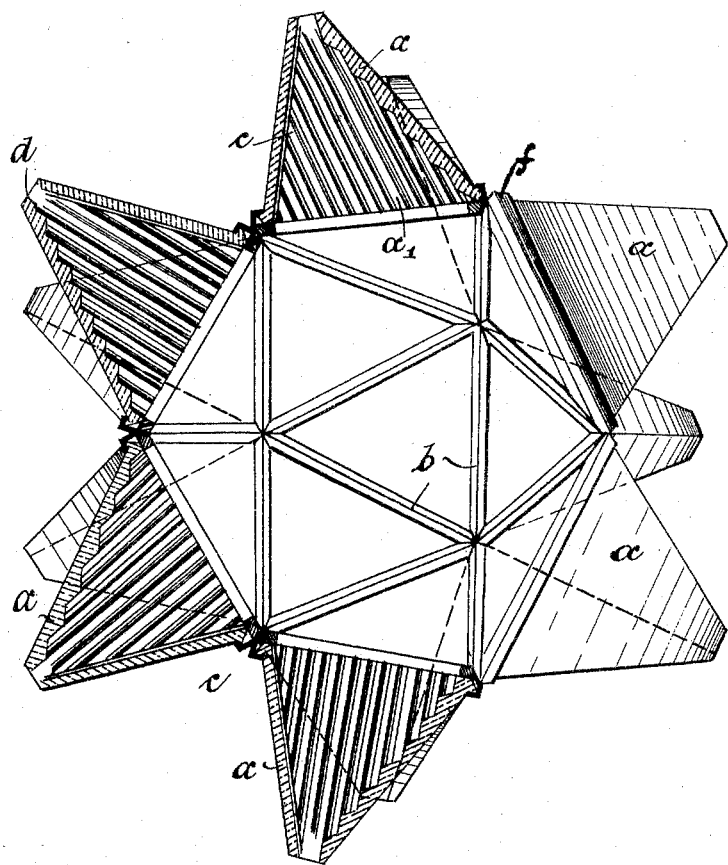
Figure 3:
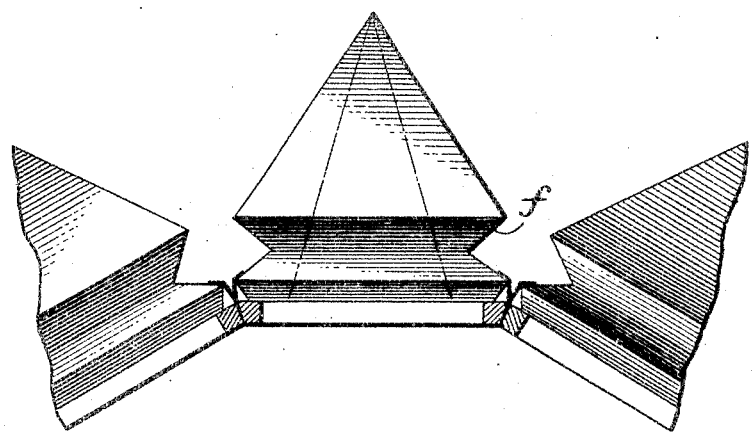
Figure 2:
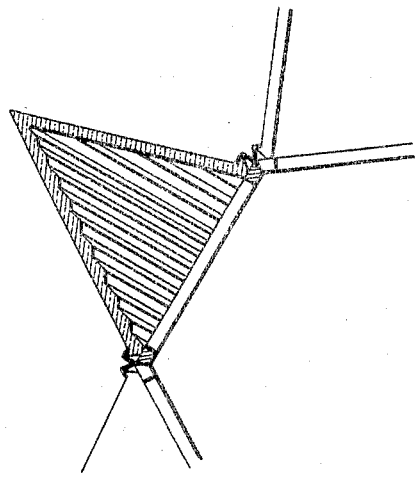

In the annexed drawings, Figure 1 represents one form of the illuminating-body, according to the present invention, partly in section and elevation. Fig. 2 is a section of a hollow body having its end pointed instead of truncated, as shown in Fig. 1; and Fig. 3 is a view showing hollow bodies in side elevation, so that the arrangement of the mirrors or reflecting-surfaces upon the outside of these bodies may be seen.

The hollow glass prisms $a$ are separately inserted into a faceted metal frame $b$, and their inner surfaces $a'$ are provided, for the purpose of producing efficient distribution and agreeable effects, with grooves $c$, shaped as mentioned above and arranged perpendicularly to the base-lines and extending toward the points. These grooves $c$ can, however, be made in the outer surfaces, and they can be made to converge toward the apices of the respective pyramids, or they can be parallel to the base-lines thereof. The inner and outer surfaces of the pyramids can be ground, and the grooves in the outer surfaces can also be ground to improve the effect.

Pyramids, prisms, or cones with wholly or partly smooth surfaces can be provided with mirrors or reflecting-surfaces $f$ on the outsides of the surfaces themselves. The pyramids can be pointed or truncated. In the latter case an aperture $d$ can be made in the truncated end, which may be closed by a lens, glass plate, short rod, or the like. The object of this arrangement is to allow rays to be directly emitted as well as deflected and diffused. Colored or uncolored dull or transparent glass can be used for the pyramids and prisms, and the lenses, glass plates, or the like inserted into truncated pyramids or prisms can also be of colored or uncolored glass, and the prisms or pyramids can be of colored glass and the plates or the like of uncolored glass, or vice versa.

I claim—

1. In an illuminating-body, the combination with a faceted metal frame, of hollow faceted glass bodies inserted into said frame, the said bodies being bounded by surfaces making angles with each other, substantially as and for the purpose set forth.

2. In an illuminating-body, the combination with a faceted metal frame, of hollow faceted glass bodies inserted into said frame, the said bodies being bounded by smooth plane surfaces making angles with each other, substantially as described.

3. In an illuminating-body, the combination with a faceted metal frame, of hollow faceted glass bodies inserted into said frame, said bodies being bounded by plane surfaces making angles with each other and having reflecting-faces or mirrors on the outsides of the surfaces themselves, as and for the purpose set forth.

4. In an illuminating-body, the combination with a faceted metal frame, of hollow faceted glass bodies inserted into said frame, said bodies being bounded by plane surfaces making angles with each other and truncated at their outer ends as and for the purpose set forth.

In testimony whereof I have signed my name to this specification in the presence of two subscribing witnesses.

MAX KORFF.

Witnesses:
 Franz Hasslacher,
 Erwin Dippel.